(12) United States Patent
 Herrmann

(10) Patent No.: US 10,343,609 B2
(45) Date of Patent: Jul. 9, 2019

(54) SAFETY MIRROR AND MOTOR VEHICLE

(71) Applicant: SMR Patents S.à.r.l., Luxembourg (LU)

(72) Inventor: Andreas Herrmann, Winnenden-Baach (DE)

(73) Assignee: SMR PATENTS S.À.R.L., Luxembourg (LU)

( * ) Notice: Subject to any disclaimer, the term of this patent is extended or adjusted under 35 U.S.C. 154(b) by 0 days.

(21) Appl. No.: 15/902,149

(22) Filed: Feb. 22, 2018

(65) Prior Publication Data

US 2018/0236940 A1 Aug. 23, 2018

(30) Foreign Application Priority Data

Feb. 22, 2017 (DE) .................. 10 2017 103 669

(51) Int. Cl.
| | |
|---|---|
| *B60R 1/12* | (2006.01) |
| *B60J 3/02* | (2006.01) |
| *H04N 7/18* | (2006.01) |
| *B60R 11/04* | (2006.01) |
| *B60J 3/00* | (2006.01) |
| *B60R 11/00* | (2006.01) |

(52) U.S. Cl.
CPC ............... *B60R 1/12* (2013.01); *B60J 3/00* (2013.01); *B60J 3/0204* (2013.01); *B60R 11/04* (2013.01); *H04N 7/18* (2013.01); *B60R 2001/1253* (2013.01); *B60R 2011/0035* (2013.01)

(58) Field of Classification Search
CPC ... B60R 1/12; B60R 11/04; B60R 2011/0035; B60R 2001/1253; B60R 11/0235; B60J 3/00; B60J 3/0204; H04N 7/18

USPC .................................................. 296/97.5
See application file for complete search history.

(56) References Cited

U.S. PATENT DOCUMENTS

| | | | |
|---|---|---|---|
| 6,947,071 | B2 | 9/2005 | Eichmann |
| 7,184,074 | B1 * | 2/2007 | Jansen ............... B60R 1/00 348/151 |
| 9,403,491 | B2 | 8/2016 | Happy et al. |
| 2017/0013188 | A1 * | 1/2017 | Kothari ............. B60R 11/0235 |
| 2018/0131908 | A1 * | 5/2018 | Salter ..................... G06F 3/044 |

FOREIGN PATENT DOCUMENTS

| | | |
|---|---|---|
| CN | 204222742 U | 3/2015 |
| EP | 2457770 B1 | 1/2014 |
| JP | 2004136837 A * | 5/2004 |

OTHER PUBLICATIONS

German Office Action dated Oct. 12, 2017 of DE 102017103669.5.
Chinese Office Action dated Jan. 24, 2019 of Chinese application No. 201810153858X.

* cited by examiner

*Primary Examiner* — Pinel E Romain
(74) *Attorney, Agent, or Firm* — Jones Day

(57) ABSTRACT

A safety mirror for a motor vehicle includes at least one sun visor including a mirror element in a folded down position; and at least one camera or monitoring system including at least one camera for taking images of an area behind and adjacent to the motor vehicle; and at least one camera mount for attaching the camera to the motor vehicle, where the safety mirror includes the mirror element and at least one attachment structure for selectively attaching the safety mirror to the sun visor or the camera mount. A motor vehicle includes such a safety mirror.

16 Claims, 1 Drawing Sheet

SAFETY MIRROR AND MOTOR VEHICLE

CROSS-REFERENCE TO RELATED APPLICATION

This application claims the benefit of foreign priority to German Patent Application No. DE 10 2017 103 669.5 filed Feb. 22, 2017, which is incorporated herein by reference in its entirety for all purposes.

BACKGROUND OF THE INVENTION

1. Field of the Invention

The following description relates to a safety mirror for a motor vehicle. A safety mirror may include at least one sun visor including a mirror element in a folded-down state which is viewable by a driver or passenger of the motor vehicle, at least one camera/monitoring system for taking pictures of an area behind and next to the motor vehicle, and at least one camera mount for attaching the camera to the motor vehicle. Furthermore, the following description relates to a motor vehicle with such a safety mirror.

2. Related Art

Movable camera systems are typically known to be used as a replacement for exterior rearview mirrors in motor vehicles.

U.S. Pat. No. 9,403,491 describes a vehicle having a vehicle body structure which has an outer side and an inner side facing the passenger compartment. A base element fixed on the outside and a video camera movable on the base element for a linear movement between a retracted position and an extended position to recording a video image is mounted from an area outside the vehicle body structure. In addition, a video display is supported on the vehicle body structure so that the video display is visible in the passenger compartment. An image processor is operatively coupled to the video camera and video display to process the video image captured by the video camera and to stream a video to the video display.

Sun visors for motor vehicles are also known in the art. Typically, when folded down, sun visors not only present a makeup mirror but also a display for displaying a television, video images and/or moving graphics, as described by German Patent Application No. DE 197 39 352 A1. The display and makeup mirror are arranged at the folded down sun visor on the visible side of the occupant of the sun visor. The display may be protected by a removable, sliding, or fold-away cover which may be a mirror.

U.S. Pat. No. 6,947,071 B2 describes a vehicle interior monitoring system having a portable display that can be removably positioned in the interior of a vehicle, the display being attachable to and removable from a surface of the interior without altering the surface. Such surfaces include those of sun visors or rearview mirrors in the passenger compartment.

European Patent No. 2 457 770 B1 describes a plastic mirror mounting system for a rearview mirror on a vehicle. The rearview mirror includes a substrate made of plastic material which is coated on a first surface with at least one reflective layer and has on its second surface means for connection to a mounting structure. The plastic substrate includes at least three plastic mirror clips. Each plastic mirror clip has at least one shoulder which increases the contact area between the plastic mirror clip and the second surface, an enlargement, which has a distance from the second surface, and an internal inclination at the end of the enlargement. The mounting structure includes mounting structure clips with rigid arms and spatially confined flexible arms. Each mounting structure clip has a stepped structure forming a step-shaped fastener complementary to the enlargement of a plastic mirror clip while the flexible arms contact the enlargement and inclination of the plastic mirror clips so that the end faces of the flexible arms and the slope secure the connection. The mounting structure may be at least part of a counter plate or part of a cover plate of a motor drive or part of a one-piece mirror housing.

A reflective coating for a polymer substrate is described by European Patent Application No. EP 2 807 284 A1 where a coating has a thickness of 200 nm or less and uses an alloy of chromium and a doping material.

While with camera images, a driver obtains an even better impression of the rearward traffic conditions, in principle there is also the danger that the camera system fails and thus there is a security risk which limits the use of camera images.

SUMMARY

In an aspect, a safety mirror for a motor vehicle includes at least one sun visor which presents a mirror element in a folded-down state to a driver or passenger of the motor vehicle, at least one camera/monitor-system for taking pictures of an area behind and next to the motor vehicle, and at least one camera mount for attaching the camera to the motor vehicle. The safety mirror includes the mirror element and at least one attachment structure for selectively attaching to the sun visor or the camera mount.

In this case, a preferred safety mirror is characterized by a substrate which is provided on one side with a reflective layer for providing a mirror surface and on the opposite side with the fastening structure.

The substrate and the attachment structure may each be made of a plastic, preferably in a 2 component molding process like a 2 component injection molding process and/or the reflective layer may include a chromium base preferably including an alloy of chromium and a doping material.

The fastening structure may include at least one first attachment element complementary to a mounting structure of the sun visor and at least one second attachment element complementary to an attachment structure of the camera mount, where each first attachment element is formed together with a second attachment element. In particular, a first attachment element identical to a second fastener may be formed.

Security mirrors may be characterized in that the attachment structure includes at least a first locking element for locking an attachment to the sun visor and/or at least a second locking element for locking an attachment to the camera mount.

The circumference of the safety mirror may have smooth edges with a radius of at least 2.5 mm.

In another aspect, a set of safety mirrors includes at least two different safety mirrors which have adaptation specifications consistent with two different countries and/or geographical regions. The mirror surface, mirror edges and/or attachment to a motor vehicle via a camera mount or a sun visor may be formed.

In yet another aspect, a motor vehicle includes at least one sun visor presenting a mirror element in a folded down condition to a driver or passenger of the motor vehicle, and at least one camera monitor system including at least one camera for taking images of an area behind and next to motor vehicle and at least one camera mount for attaching the camera to the motor vehicle, where the mirror element is included in a safety mirror.

The safety mirror may be mounted in a first position determined by a normal operation of the camera-monitor system on the sun visor so that the folded down state of the sun visor is accessible. The safety mirror of the sun visor may be releasable preferably by engagement with one hand in at least one engaging tab of the sun visor, in particular two fingers of the hand in two engaging tabs on two opposite sides of the safety mirror, and/or by applying a force of 40 to 100 N.

The safety mirror may be mounted in a second position, in particular in the case of a detected defect of the camera-monitor system, on the camera mount via its at least one second fastening element.

The safety mirror can be connected to the sun visor or the camera mount via a preferably clipable or latching connection, preferably via the attachment structure of the safety mirror.

In addition, motor vehicles may include a sun visor having at least one attachment element, preferably at least one attachment element and a locking element, for attachment of the safety mirror, and/or the camera mount at least one attachment element, preferably at least one attachment element and a locking element, for the attachment of the safety level includes.

The safety mirror may be adapted to the delivery country and/or the geographical region of the delivery of the motor vehicle, in particular concerning the mirror surface, mirror edges and/or attachment to the sun visor and/or camera mount, and/or the sun visor to the delivery country and/or the geographical region of the delivery of the motor vehicle is adjusted, in particular with regard to the attachment of the safety mirror, and/or the camera mount is adapted to the delivery country and/or the geographical region of delivery of the motor vehicle, in particular relating to the attachment of the safety mirror.

The sun visor in the motor vehicle and a camera mount outside the motor vehicle for attaching a safety mirror may be respectively arranged on the driver side and the passenger side.

According to multiple aspects and advantages, a mirror, which is detachably mounted on a sun visor in the motor vehicle and serves as a vanity mirror, can be removed from the sun visor in the event of the failure of a camera/monitor-system which replaces a previously customary exterior rearview mirror in order to be attachable to a camera mount outside the motor vehicle to fulfill the function of an exterior rearview mirror. Thus, the mirror is a safety mirror, which is mounted in normal operation on a sun visor within a motor vehicle and, if necessary, can be attached to a camera mount outside the motor vehicle.

The safety mirror may be designed such that it provides the requirements by law for an exterior rearview mirror field of view. Furthermore, it can be attached to the camera mount in alignment with the mediated eye position of a motor vehicle driver.

The attachment of the safety mirror to the sun visor is by hand detachable. The required force should therefore preferably not exceed a hand force of 40 to 100 N. Also, the safety mirror of the sun visor may be detachable in a non-destructive manner.

When attaching the safety mirror to the camera mount, there should be no distortion of the mirror surface due to fasteners formed with the safety mirror.

If a vehicle equipped with at least one safety mirror and the vehicle is delivered in Europe, the safety mirror may be adapted to the legal requirements in Europe, in particular regarding the field of view, when attached to a sun visor and/or on a camera mount, and to reduce a risk of injury, such as due to mirror edges. The field of view may be determined primarily by the geometry of the mirror surface, in particular the curvature and size thereof, as well as the positioning on the camera mount.

BRIEF DESCRIPTION OF THE FIGURES

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DETAILED DESCRIPTION

Figure 1:
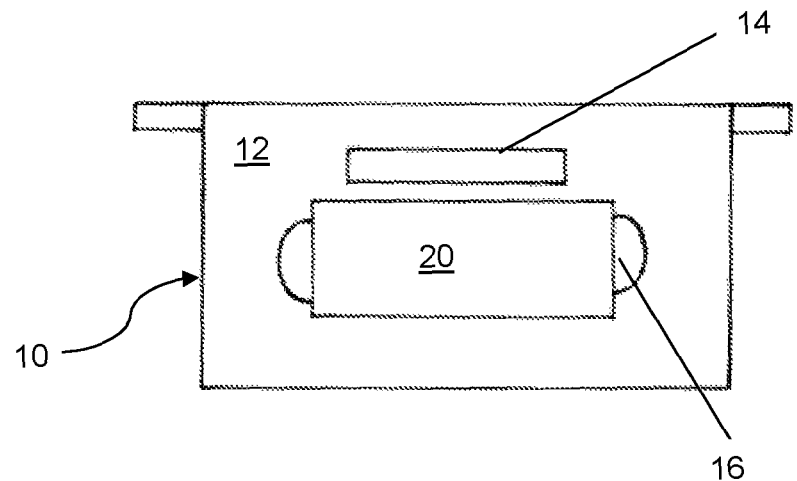
FIG. 1 is a diagram illustrating a plan view of a folded-down sun visor with a safety mirror.

FIG. 1 shows a folded down sun visor 10 from the perspective of a driver or passenger of a motor vehicle (not shown). The inner surface 12 of the visor 10 is therefore presented to the driver or passenger within a passenger compartment (not shown). On the inner surface 12 of the sun visor 10, a light module 14 and engaging tabs 16 are provided in the region of a safety mirror 20.

Figure 2:
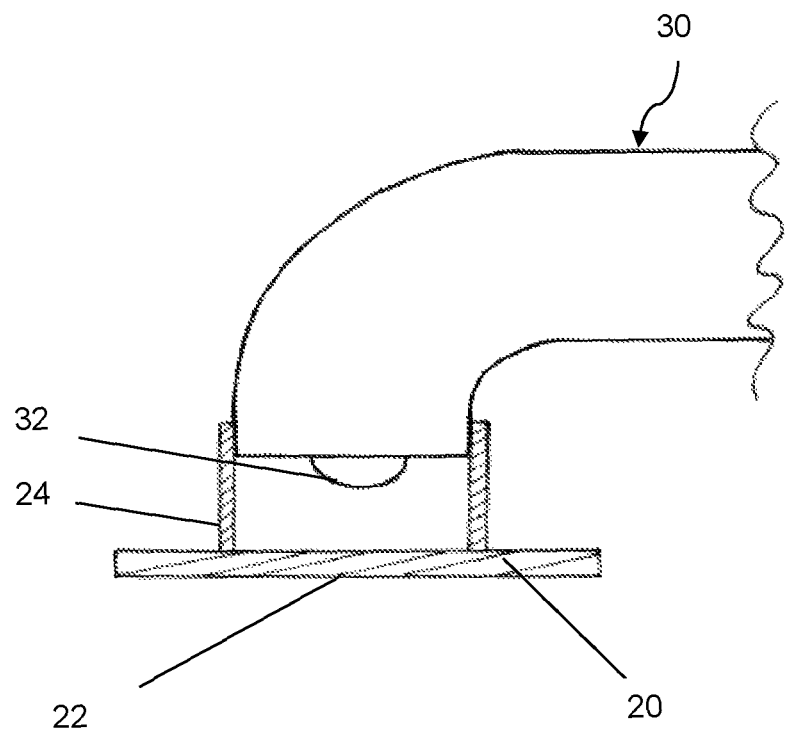
FIG. 2 is a diagram illustrating a sectional view of the safety mirror of FIG. 1 on a camera mount.

The safety mirror 20 may optionally be placed on a camera mount 30 outside of the motor vehicle according to FIG. 2. For this purpose, the safety mirror 20 includes a mirror surface 22, in particular in the form of a chromium-based reflection layer, as described in EP 2 807 284 A1. The reflective layer can be applied to a plastic substrate, which can be formed on its back with fasteners 24, for example, in a 2K injection molding together.

The camera mount 30 carries a video camera (not shown) with a lens 32.

The fastening elements 24 of the safety mirror 20 are shaped such that they allow a secure attachment either to the sun visor 10 or to the camera pawl 30, in particular via a clip connection as known, for example, as described in EP 2 457 770 B1.

The safety mirror 20 thus fulfills a plurality of functions, namely the function of a make-up mirror in the position shown in FIG. 1 and that of a rear-view mirror in the position shown in FIG. 2. To fulfill these functions, the mirror surface 22 is to be dimensioned accordingly.

An inventive motor vehicle can be equipped both on the driver and on the passenger side with a sun visor 10 and a camera mount 30 so that then on each of the two sides a safety mirror 20 is provided for attachment either to the corresponding sun visor 10 or camera mount 30.

Each safety mirror 20, each sun visor 10 and each camera mount 30 may be adapted to the country of delivery of the motor vehicle, and that concerning the respective statutory provisions.

In the following, a change in the position of the safety mirror 20 will be described with reference to FIGS. 1 and 2:

In normal operation of a camera/monitor-system, which includes in particular the camera mount 30 together with the lens 32, the safety mirror 20 is attached to the sun visor 10. If there is a defect of the camera/monitor-system, a driver can fold down the visor 10, as shown in FIG. 1, engage with two fingers of his right hand in two engaging tabs 16 left and right of the safety mirror 20 in the sun visor 10 to release the connection between the safety mirror 20 and the sun visor 10 by pulling out the safety mirror 20. The force to be applied during release can therefore be between 40 and 100 N.

The safety mirror 20 released from the sun visor 10 can then be placed on the camera mount 30 by the driver so that the fasteners 24 engage the camera pawl 30. This position, which is shown in FIG. 2, can be locked by a locking element (not shown) preferably releasably.

The features of the invention disclosed in the preceding description, the claims and drawings may be essential both individually and in any combination for the realization of the invention in its various embodiments.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

What is claimed is:

1. A safety mirror system for a motor vehicle, comprising:
   at least one sun visor comprising a mirror in a folded down position; and
   at least one camera or monitoring system comprising
      at least one camera for taking images of an area behind and adjacent to the motor vehicle; and
      at least one camera mount for attaching the camera to the motor vehicle,
   wherein the safety mirror further comprises at least one attachment structure for separately and selectively attaching the safety mirror to each of the sun visor and the camera mount.

2. The safety mirror system according to claim 1, further comprising a substrate provided on one side with a reflective layer for providing a mirror surface and on an opposite side of the attachment structure.

3. The safety mirror system according to claim 2, wherein at least one of
   the substrate and the attachment structure are each made of a plastic in a two component molding process; and
   the reflective layer comprises a chromium base.

4. The safety mirror system according claim 1, wherein the attachment structure comprises at least a first attachment element complementary to a visor attachment structure of the sun visor and at least one second attachment element complementary to a mounting structure of the camera mount.

5. The safety mirror system according to claim 4, wherein at least one of
   each first fastening element is formed together with a second fastening element: and
   each first fastening element is formed identically with a second fastening element.

6. The safety mirror system according to claim 1, wherein the attachment structure comprises at least one of:
   at least a first locking element for locking an attachment to the sun visor; and
   at least a second locking element for locking an attachment to the camera mount.

7. The safety mirror system of claim 1, wherein a periphery of the safety mirror has smooth edges with a radius of at least 2.5 mm.

8. A set of safety mirrors, comprising
   at least two different safety mirror systems according to one claim 1, wherein each of the safety mirrors is configured to be adapted to specifications of two different countries or geographic regions.

9. A motor vehicle, comprising:
   at least one sun visor, the sun visor comprising a mirror element in a folded down position,
   at least one camera or monitoring system comprising
      at least one camera for taking pictures of an area behind and next to the motor vehicle; and
      at least one camera mount for attaching the camera to the motor vehicle, wherein the mirror element is a safety mirror according to claim 1.

10. The motor vehicle according to claim 9, wherein the safety mirror in a first position, determined by normal operation of the camera or monitoring system, is attached to the sun visor via at least one first fastening element so that in a folded-down state of the sun visor it is accessible to a driver or passenger of the motor vehicle, and the safety mirror is detachable from the sun visor by the driver or passenger.

11. The motor vehicle according to claim 10, wherein the safety mirror is detachable from the sun visor by engagement with one hand in at least one engaging tab of the sun visor or by applying a force of 40 to 100 Newton.

12. The motor vehicle according to claim 9, wherein the safety mirror is mounted in a second position on the camera mounting via at least one second fastening element.

13. The motor vehicle according to claim 9, wherein the safety mirror is configured to be connected to the sun visor or the camera mounting via a clip or a latching connection.

14. The motor vehicle according to claim 9, wherein at least one of
   the sun visor comprises at least one mounting element for attaching the safety mirror; and
   the camera mounting comprises at least one mounting element for mounting the safety mirror.

15. The motor vehicle according to claim 9, wherein at least one of
   the safety mirror is configured to be adapted to a country of delivery or geographical region of delivery of the motor vehicle;
   the sun visor is configured to be adapted to a country of delivery or geographical region of delivery of the motor vehicle; and
   the camera mount is configured to be adapted to a country of delivery or geographical region of delivery of the motor vehicle.

16. The motor vehicle according to claim 9, wherein the sun visor is arranged in the motor vehicle on a driver's side, and the camera mounting is arranged outside the motor vehicle for attaching a safety mirror on the passenger side.

* * * * *